(12) United States Patent
Voipio

(10) Patent No.: US 6,907,182 B2
(45) Date of Patent: Jun. 14, 2005

(54) OPTICAL CONDUCTOR

(75) Inventor: Ville Voipio, Vantaa (FI)

(73) Assignee: Janesko Oy, Vantaa (FI)

( * ) Notice: Subject to any disclaimer, the term of this patent is extended or adjusted under 35 U.S.C. 154(b) by 0 days.

(21) Appl. No.: 10/298,934

(22) Filed: Nov. 19, 2002

(65) Prior Publication Data

US 2003/0099427 A1 May 29, 2003

(30) Foreign Application Priority Data

Nov. 23, 2001 (FI) .............................................. 20012303

(51) Int. Cl.⁷ .............................................. G02B 6/10
(52) U.S. Cl. ........................... 385/146; 385/27; 385/31; 385/39
(58) Field of Search ............................ 385/15, 31, 129, 385/130, 901, 146, 10, 36; 362/560, 26, 31, 27; 349/65

(56) References Cited

U.S. PATENT DOCUMENTS

| | | | | |
|---|---|---|---|---|
| 4,112,293 A | | 9/1978 | Käch | |
| 4,765,701 A | * | 8/1988 | Cheslak | 350/96.1 |
| 5,568,130 A | | 10/1996 | Dahl | |
| 5,608,837 A | * | 3/1997 | Tai et al. | 385/146 |
| 5,835,661 A | * | 11/1998 | Tai et al. | 385/146 |
| 6,208,423 B1 | | 3/2001 | Voipio et al. | |
| 6,565,225 B2 | * | 5/2003 | Mabuchi et al. | 362/31 |
| 6,636,283 B2 | * | 10/2003 | Sasagawa et al. | 349/65 |

FOREIGN PATENT DOCUMENTS

| | | |
|---|---|---|
| EP | 0 594 089 A1 | 4/1994 |
| WO | 01/61241 A1 | 8/2001 |
| WO | 02/21177 A1 | 3/2002 |

* cited by examiner

Primary Examiner—Frank G. Font
Assistant Examiner—Michael P. Mooney
(74) Attorney, Agent, or Firm—Burns, Doane, Swecker & Mathis, L.L.P.

(57) ABSTRACT

An optical conductor comprising a rod-like part made of a light-conducting material. To accomplish a mechanically durable structure, a side surface of the rod-like part is provided with a groove, at least one side surface of which is arranged to form a surface acting as a reflective or permeable surface for light.

15 Claims, 2 Drawing Sheets of the groove 2 and are reflected to the reference detector 8 as a total internal reflection in the manner of a prism. Thus, the optical conductor of the invention is suitable for measurements where it is required to direct a part of a light beam to a reference detector. It should, however, be understood that the invention is not restricted to this application only but it is of use also in other applications.

OPTICAL CONDUCTOR

FIELD OF THE INVENTION

BACKGROUND OF THE INVENTION

The invention relates to an optical conductor comprising a rod-like part made of a light-conducting material.

Today, optical conductors mentioned above are well known, for instance, from various measurements, which measure properties of different substances, such as properties of solutions. An example of such devices is a refractometer. Another example is a calorimeter.

In association with measurements, reference measurements must often be carried out. A reference measurement is carried out by passing part of light to be passed to an object to be measured to a reference detector. The above-mentioned reference measurement is implemented, for instance, by using a semi-transparent mirror, by which part of light to be directed to the measurement object is led to the reference detector.

In principle, the arrangement based on a semi-transparent mirror operates well. The problem of the principle is, however, its complexity. Conditions in practical industrial processes are demanding, so the measuring devices have to be physically durable. Problems are caused, for instance, by vibrations and temperature changes. It is fairly difficult to accomplish a solution based on a semi-transparent mirror which is physically durable, since solutions based on a mirror and lenses are quite sensitive to vibrations, for example, as the positions of the mirrors and the lenses change easily due to the vibration. The problem is made worse by the fact that even small changes in the positions of the mirror or the lens may lead to large errors or cause total inoperativeness of the entire device. Because of the complexity the structures are also relatively expensive and the maintenance costs thereof are disadvantageously high. In some cases, a further problem is that the structures are relatively large.

OBJECTS AND SUMMARY

It is an object of the invention to provide an optical conductor by which the prior art drawbacks can be eliminated. This is achieved by an optical conductor of the invention. The optical conductor of the invention is characterized in that a side surface of the rod-like part is provided with a groove, at least one side surface of which is arranged to form a surface acting as a reflective or permeable surface for light.

Above all, the invention provides the advantage that the optical conductor of the invention is physically very durable, which means that the solution of the invention does not comprise, for instance, mirrors which move easily, for instance due to vibrations. For the above-mentioned reason, the invention is thus very suitable to be used in demanding conditions of industrial processes. An advantage of the invention is also its small size and good pressure-proof properties. A small size is a beneficial property in spatially limited industrial conditions. Good pressure-proof properties are due to a compact structure which does not collapse even at high pressure.

BRIEF DESCRIPTION OF THE DRAWINGS

In the following the invention will be described in greater detail by means of a preferred embodiment illustrated in the attached drawing, in which.

DETAILED DESCRIPTION OF THE PREFERRED EMBODIMENTS

Figure 1:
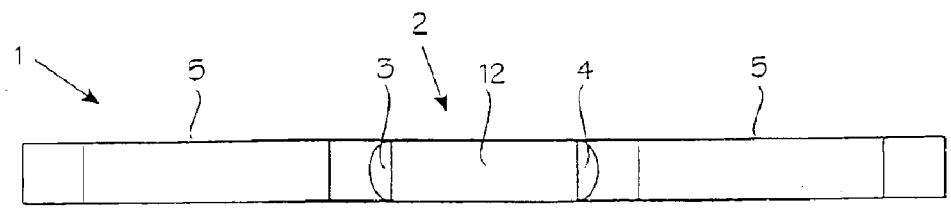
FIG. 1 is a schematic view of an optical conductor of the invention.
Figure 2:
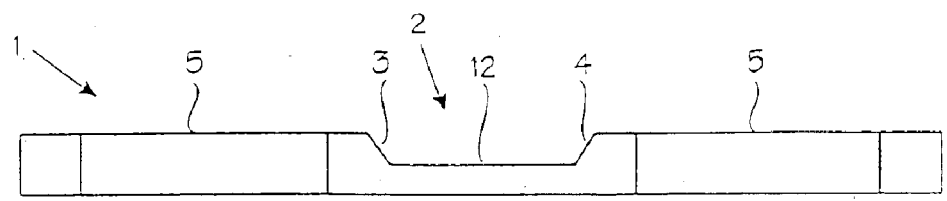
FIG. 2 shows the optical conductor of FIG. 1 from another direction, FIG. 3 schematically illustrates the operation of the optical conductor of the invention in a measurement situation, FIG. 4 schematically illustrates the operation of the optical conductor of the invention in another measurement situation, FIG. 5 schematically illustrates the operation of the optical conductor of the invention in a third measurement situation, FIG. 6 schematically illustrates the operation of a second embodiment of the optical conductor of the invention in a measurement situation.

FIGS. 1 and 2 show a preferred embodiment of an optical conductor of the invention. The optical conductor of the example according to FIGS. 1 and 2 is formed of an elongated rod-like part 1 made of a glass material. The manufacture and operating principle of the rod-like part represent fully conventional prior art to a person skilled in the art, wherefore they will not be described in greater detail herein. In this context, only a general remark is made that a core of the rod is made of a material with a high refractive index and a cladding on the outer surface of the core is made of a material with a low refractive index. If a ray of light advancing in the core of the rod 1 strikes the interface between the core and the cladding in a small angle, the ray is reflected from this surface as total internal reflection. The critical angle of the reflection can be calculated from the Snell's law, when the refractive index of the cladding layer and that of the core are known. If the angle of incidence of the ray of light is larger than the critical angle, the ray enters the cladding and strikes the interface between the cladding and the surroundings. This interface has its own critical angle, and it is possible that total internal reflection occurs at this interface. In many applications, it is beneficial to remove the rays which would advance to the cladding. This can be accomplished by removing the cladding from a segment of the rod or by coating the rod by a very absorbing material.

According to the essential idea of the invention, the side surface of the rod-like part 1 is provided with a groove 2. According to an aspect of the invention, at least one side surface 3, 4 of the groove 2 is arranged to form a surface acting as a reflective surface for light. In the invention, the side surface of the groove 2 thus acts as a prism surface where total internal reflection takes place. In the example of FIGS. 1 and 2, the total internal reflection critical angle is determined by the refractive indices of the core material and air, as there is no cladding on the surface 3, 4 acting as a mirror surface. The parts outside the groove 2 area are coated with a black coating 5 to remove rays that have propagated to the cladding.

Figure 3:
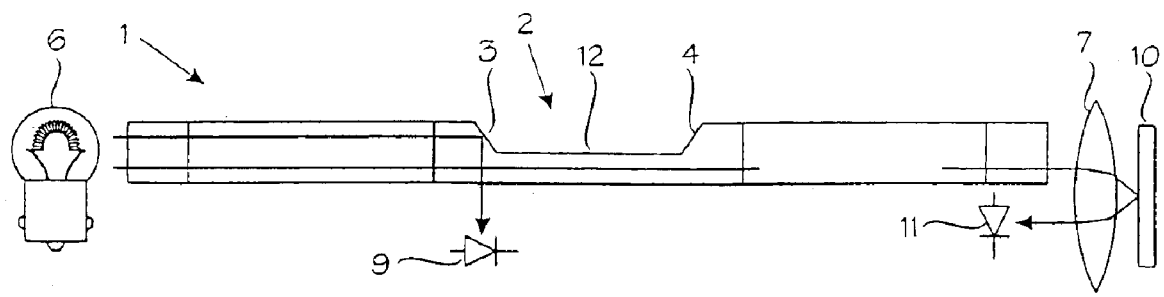

FIG. 3 illustrates a basic operational principle of the optical conductor according to FIGS. 1 and 2. The same reference numbers as in FIGS. 1 and 2 are used for corresponding parts of FIG. 3. A light source is marked with a reference number 6 in FIG. 3. In FIG. 3, arrows illustrate how rays of light produced by the light source 6 propagate in the rod-like part. Some of the rays pass through the rod-like part and are directed with a suitable optics 7 to a measurement object 10. Some rays of light strike the surface 3 where total internal reflection occurs in a manner shown by the figure, and the light is directed to the side to reference measuring devices 9.

Depending on the properties of the measured substance, the light directed to the measurement object 10 by means of the optics 7 is reflected back, whereupon it can be directed to a measuring device 11 by means of the suitable optics.

Figure 4:
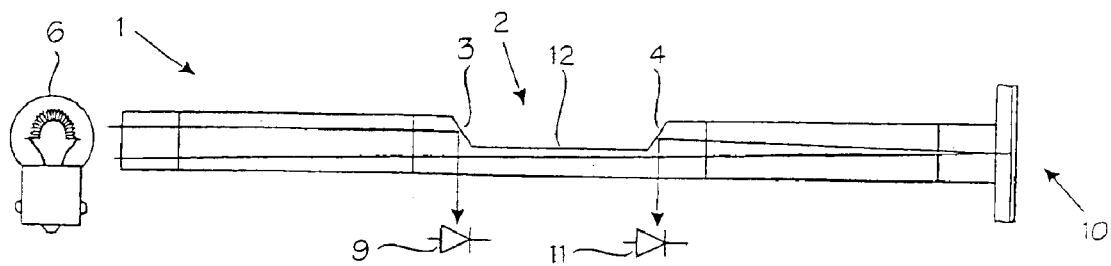

Most preferably, the invention can be applied such that both side surfaces 3, 4 of the groove 2 are arranged to form a reflective surface for light. Such an application is shown in FIG. 4. The operation of the embodiment according to FIG. 4 corresponds to the basic principle shown in FIG. 3. The same reference numbers as in FIGS. 1 to 3 are used for corresponding parts in FIG. 4.

In the application of FIG. 4, light is directed to the reference measuring devices 9 similarly as in the example of FIG. 3. In the example of FIG. 4, light is directed to the measuring devices 11 by means of the surface 4 acting as a reflective surface. The operation of the reflective surface 4 is similar to the operation of the surface 3. The measurement object 10 can be a pH measurement of a solution, for instance, whereby it is particularly advantageous to use a film solution described in Finnish Patent Application 981424 (U.S. Pat. No. 6,208,423).

The application of FIG. 4 provides, for instance, the advantage that both the reference measuring device 9 and the measuring device 11 can be arranged next to and close to each other, which also provides a very small-sized implementation.

Figure 5:
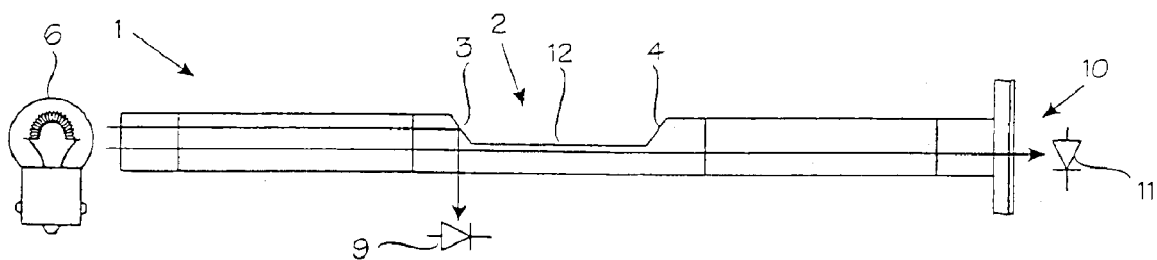

FIG. 5 shows a variation of the embodiment of FIG. 4. The same reference numbers as in FIGS. 1 to 4 are used for corresponding parts in FIG. 5. A difference between the application of FIG. 5 and that of FIG. 4 is that in the application of FIG. 5, the measuring means 11 are placed in a different manner than in the application of FIG. 4.

Preferably the depth of the groove 2 formed in the side surface of the rod-like part 1 is equal to substantially half the thickness of the rod-like part, and surfaces acting as reflective surfaces for light are preferably at angles of 45 degrees and 135 degrees, respectively, to the longitudinal axis of the rod-like part, when the angles are viewed from the light source in the direction of the measurement object. The surface or surfaces acting as reflective surfaces for light are also preferably in a transverse position to the longitudinal axis of the rod-like part. This can be seen particularly clearly in FIG. 1.

In the examples of the figures, the bottom of the groove 2 in the side surface of the rod-like part 1 is formed substantially of a planar surface 12 in the axial direction of the rod-like part. The surfaces 3, 4 acting as reflective surfaces for light are arranged to be at a distance from each other, when viewed from the longitudinal direction of the rod-like part. This detail can be clearly seen in FIG. 2, for instance.

Figure 6:
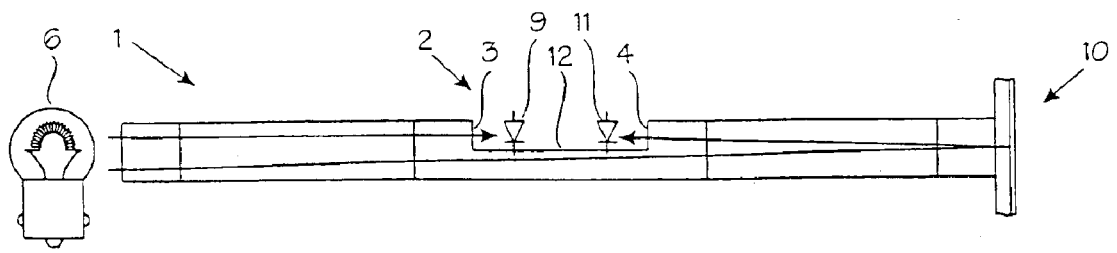

However, the position of the surfaces 3, 4 is not restricted to, for instance, 45 degrees in any way, but according to a second aspect of the invention, the surfaces may also be in other positions, whereby in some applications the surfaces 3, 4 can function, instead of reflective surfaces, as permeable surfaces and a sample from light is taken as a permeation. FIG. 6 shows an application in which the surfaces 3, 4 are substantially in a transverse position with respect to the axial direction of the rod-like part 1. The reference measuring devices 9 and the measuring devices 11 can thus be arranged next to each other at the groove, as shown by FIG. 6.

In the embodiment of FIG. 6, the angles of incidence at which rays of light arrive at the surfaces 3, 4 are larger than the critical angles of incidence, and so the light passes through these surfaces to the reference measuring devices 9 and the measuring devices 11, respectively, whereby, in this application, a sample is taken as a permeation, as described above.

The above application examples are not intended to restrict the invention in any way but the invention may be modified freely within the scope of the claims. Thus, it is obvious that an optical conductor of the invention or the details thereof need not necessarily be exactly like those in the figure, but other solutions are also possible. For example, the cross section of the optical conductor of the invention need not be round, but it can be different, such as quadrangular etc. The groove need not be a flat-bottomed groove as shown by the figures, but also the use of a V-shaped groove, for instance, is possible. The practice has shown, however, that a flat-bottomed groove according to the figures provides the rod-like part with advantageous strength properties. However, the bottom of the groove need not be completely flat, but it may also have a slightly concave surface etc.

What is claimed is:

1. An optical conductor comprising:
   a rod-like part made of a light-conducting material, wherein a side surface of the rod-like part is provided with a groove, said side surface being substantially continuous throughout said rod-like part on both sides of said groove, at least one side surface of said groove being arranged to form a surface acting as a reflective or permeable surface for light; and
   wherein the bottom of the groove is formed substantially of a planar surface in the axial direction of the rod-like part and that the surfaces acting as reflective or permeable surfaces for light are arranged to be at a distance from each other when viewed from the longitudinal direction of the rod-like part.

2. An optical conductor as claimed in claim 1, wherein both side surfaces of the groove are arranged to form a surface acting as a reflective or permeable surface for light.

3. An optical conductor comprising:
   a rod-like part made of a light-conducting material, wherein a side surface of the rod-like part is provided with a groove, at least one side surface of which is arranged to form a surface acting as a reflective or permeable surface for light; and
   wherein the depth of the groove is equal to substantially half the thickness of the rod-like part, and a bottom of the groove is formed substantially of a planar surface in an axial direction of the rod-like part.

4. An optical conductor as claimed in claim 1, wherein the surface acting as a reflective surface for light is substantially at an angle of 45 degrees to the longitudinal axis of the rod-like part.

5. An optical conductor as claimed in claim 1, wherein the surfaces acting as reflective surfaces for light are substantially at angles of 45 degrees and 135 degrees to the longitudinal axis of the rod-like part.

6. An optical conductor comprising:
   a rod-like part made of a light-conducting material, wherein a side surface of the rod-like part is provided with a groove, at least one side surface of which is arranged to form a surface acting as a reflective or permeable surface for light; wherein the bottom of the groove is formed substantially of a planar surface in the axial direction of the rod-like part and that the surfaces acting as reflective or permeable surfaces for light are arranged to be at a distance from each other when viewed from the longitudinal direction of the rod-like part; and wherein the surface or surfaces acting as reflective surfaces for light are substantially transverse to the axial direction of the rod-like part.

7. An optical conductor as claimed in claim 4, wherein both side surfaces of the groove are arranged to form a surface acting as a reflective or permeable surface for light.

8. An optical conductor as claimed in claim 4, wherein the surface acting as a reflective surface for light is substantially at an angle of 45 degrees to the longitudinal axis of the rod-like part.

9. An optical conductor as claimed in claim 4, wherein the surfaces acting as reflective surfaces for light are substantially at angles of 45 degrees and 135 degrees to the longitudinal axis of the rod-like part.

10. An optical conductor as claimed in claim 4, wherein the surface or surfaces acting as reflective surfaces for light are substantially transverse to the axial direction of the rod-like part.

11. An optical conductor comprising:
   a rod made of a light-conducting material, said rod having a first end and a second end, wherein a surface of the rod is provided with a single groove having side surfaces, said surface of the rod being substantially smooth from said side surfaces of said groove to said ends of said rod, at least one side surface of the groove is arranged to form a surface acting as a reflective or permeable surface for light; and
   wherein a bottom of the groove is formed substantially of a planar surface in a axial direction of the rod and the side surfaces are arranged to be at a distance from each other along the axial direction of the rod.

12. An optical conductor as claimed in claim 11, wherein both side surfaces are arranged to form a surface acting as a reflective or permeable surface for light.

13. An optical conductor as claimed in claim 11, wherein the side surface acting as a reflective surface for light is substantially at an angle of 45 degrees to a longitudinal axis of the rod.

14. An optical conductor as claimed in claim 11, wherein the side surfaces acting as reflective surfaces for light are substantially at angles of 45 degrees and 135 degrees to a longitudinal axis of the rod.

15. An optical conductor comprising:
   a rod made of a light-conducting material, wherein a surface of the rod is provided with a groove having side surfaces, at least one side surface of the groove is arranged to form a surface acting as a reflective or permeable surface for light; and
   wherein a bottom of the groove is formed substantially of a planar surface in a axial direction of the rod and the side surfaces are arranged to be at a distance from each other along a axial direction of the rod; and
   wherein the surface or surfaces acting as reflective surfaces for light are substantially transverse to the axial direction of the rod.

* * * * *